Q. A. BRACKETT.
VIBRATING RECTIFIER.
APPLICATION FILED MAY 14, 1915.
1,311,490.  Patented July 29, 1919.
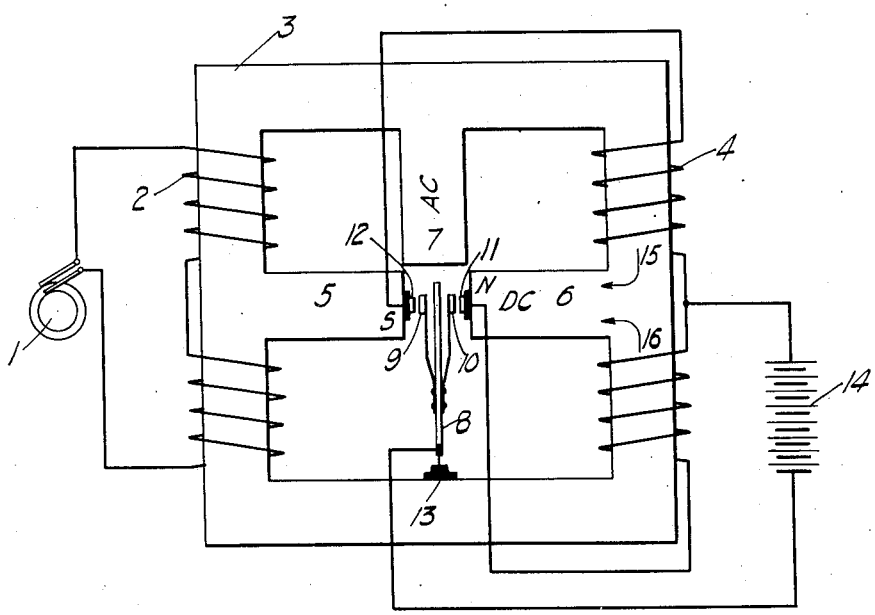
WITNESSES:
C. Fornander
D. C. Davis.
INVENTOR
Quincy A. Brackett.
BY
Wesley G. Carr
ATTORNEY

UNITED STATES PATENT OFFICE.

QUINCY A. BRACKETT, OF PITTSBURGH, PENNSYLVANIA, ASSIGNOR TO WESTINGHOUSE ELECTRIC AND MANUFACTURING COMPANY, A CORPORATION OF PENNSYLVANIA.

VIBRATING RECTIFIER.

1,311,490.  Specification of Letters Patent.  Patented July 29, 1919.

Application filed May 14, 1915. Serial No. 28,072.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Vibrating Rectifiers, of which the following is a specification.

My invention relates to current rectifiers of the mechanical or vibrating type, and it has for its object to provide means whereby the coacting operating magnetic fluxes in a device of the character described may be developed in a simple manner by suitable modification of an ordinary transformer.

The accompanying figure is a diagrammatic view of a rectifier embodying one form of my invention.

In the operation of current rectifiers of the mechanical or vibrating type, it is customary to provide two coacting magnetic fluxes, one of which is unidirectional and the other of which is alternating. In the prior art, it has been customary to provide a unidirectional magnetic flux either by a permanent magnet or by a separate winding excited from a source of direct current.

By my invention, I am enabled to obtain the two above-mentioned magnetic fluxes in a simple and effective manner without the use of any windings except those of the ordinary transformer commonly employed with rectifiers and without the use of a separate exciting source of direct current.

Referring to the accompanying drawing, a source of alternating current 1 is connected to the primary winding 2 of a transformer 3 carrying a secondary winding 4. The core of the transformer 3 is substantially rectangular in cross section and the primary and secondary windings are necessarily widely separated and distinct from each other. A leakage path for magnetic flux is provided between points in the core of the transformer 3 adjacent to the midpoints of the primary and secondary windings by means of suitable pole pieces 5 and 6. In like manner, a path for leakage flux connects points between the windings 2 and 4 and is composed of a pole piece 7 and a vibrating or pivoted member 8 of magnetic material. The member 8 carries suitable contact members 9 and 10 for coacting with similar fixed contact members 11 and 12, preferably mounted on the tips of the members 5 and 6 and insulated therefrom. The member 8 is also insulated from the core member of the transformer 3 by suitable means 13. The contact members 11 and 12 are connected respectively to the terminals of the secondary winding 4 and the vibrating member 8 is connected to substantially the midpoint of the secondary winding 4 through a suitable direct current load such, for example, as a battery 14.

Having thus described the structure of my rectifier, the operation is as follows:

Upon setting the reed 8 into oscillation by any suitable and well known means, contact will be made alternately at the contact member 11 and at the contact member 12 and current from the secondary winding 4 will be rectified and supplied to the battery 14 as is well known in the art. The alternate pulses of current in the two halves of the secondary winding 4 will set up waves of magnetic flux as indicated by arrows 15 and 16 and these waves of magnetic flux will consolidate to form a unidirectional magnetic flux through the pole pieces 5 and 6 in the manner described in an application for United States Patent, Serial No. 840,724, filed by Ray P. Jackson and assigned to the Westinghouse Electric and Manufacturing Company. An alternating magnetic flux will be established through the pole piece 7 and the reed 8 similar to the ordinary transformer leakage flux. As a result, the upper end of the reed 8 will be continually reversing in magnetic polarity at synchronous speed and will coact with the unidirectional poles 5 and 6 so as to vibrate in synchronism for rectifying the current from the secondary winding 4, as is desired.

Obviously, the two magnetic leakage paths of my device may be transposed, that is to say, the reed 8 may be caused to form a part of the unidirectional leakage flux path, whereas the alternating flux path is provided by two fixed pole pieces.

I wish it to be distinctly understood that my rectifier may be provided with any old and well known means for suppressing or obviating sparking or for suitably adjusting the phase of the current in the different parts of the apparatus. All of such means are old and well known in the art and do not constitute a part of the present invention and a description thereof is omitted therefore for the sake of simplicity.

While I have described my invention in the preferred form thereof, it will be obvious to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. In a rectifier of the mechanical type, rectifying parts dependent for their operation upon the interaction of a unidirectional magnetic flux and an alternating magnetic flux, a transformer, and means for producing each of said magnetic fluxes as leakage fluxes of windings on said transformer.

2. In a mechanical rectifier, the combination with a transformer, of means for producing therein a rectified leakage flux, additional means for producing therein an alternating leakage flux, and means whereby said two fluxes, by their interaction, drive said rectifier.

3. The combination with a transformer provided with a split secondary winding, of means therein for providing a path for alternating leakage flux, additional means therein for providing a leakage path for unidirectional magnetic flux when current is drawn alternately from each half of said secondary winding, members arranged for relative movement, and means whereby said two fluxes coact to establish mechanical movement of said members.

4. The combination with a transformer provided with a split secondary winding, of means therein for providing a path for alternating leakage flux, additional means therein for providing a leakage path for unidirectional magnetic flux when current is drawn alternately from each half of said secondary winding, and means whereby the interaction of said two leakage fluxes manipulates a switching device for the rectification of current of like frequency to that supplied to the transformer.

5. The combination with a transformer provided with a split secondary winding, of means therein for providing a path for alternating leakage flux, additional means therein for providing a leakage path for unidirectional magnetic flux when current is drawn alternately from each half of said secondary winding, and means whereby the interaction of said two leakage fluxes manipulates a switching device whereby circuits through each half of said secondary winding are closed alternately.

6. Means for providing interacting unidirectional and alternating magnetic fluxes for the operation of a vibratory rectifier comprising a transformer provided with a core member carrying separated primary and secondary windings, a flux leakage path connecting points in said core member adjacent the mid points of said windings and a flux leakage path connecting points in said core lying between said windings, a portion of one of said leakage paths being composed of a movable member carrying a contact member arranged to coact with a pair of fixed contact members to rectify current from said secondary winding.

7. The combination with a transformer having a core member which forms a substantially closed magnetic circuit and is provided with separated primary and secondary windings, of a source of alternating current connected to said primary winding, means for providing a flux leakage path across said core member connecting substantially the mid points of said windings, means for establishing an additional leakage path across said core member between points thereof between said windings, a portion of one of said leakage paths comprising a movable member of magnetic material provided with a contact member connected to substantially the mid point of said secondary winding through a direct current consumption circuit, and a pair of fixed contact members mounted adjacent to said movable contact member and connected, respectively, to terminals of said secondary winding, whereby said movable member will be caused to oscillate its contact member between said fixed contact members and alternating current from said secondary winding will be rectified and supplied to said consumption circuit.

In testimony whereof, I have hereunto subscribed my name this 29th day of April 1915.

QUINCY A. BRACKETT.